United States Patent [19]

Hill et al.

[11] Patent Number: 5,191,610

[45] Date of Patent: Mar. 2, 1993

[54] REMOTE OPERATING SYSTEM HAVING SECURE COMMUNICATION OF ENCODED MESSAGES AND AUTOMATIC RE-SYNCHRONIZATION

[75] Inventors: John P. Hill, Westland, Mich.; Alan M. Finn, Amston, Conn.

[73] Assignee: United Technologies Automotive, Inc., Dearborn, Mich.

[21] Appl. No.: 843,402

[22] Filed: Feb. 28, 1992

[51] Int. Cl.$^5$ .............................................. H04L 9/00
[52] U.S. Cl. ...................................... 380/21; 380/23; 380/25; 380/46; 380/48; 380/50
[58] Field of Search ............................ 380/21, 23–25, 380/46, 48, 50

[56] References Cited

U.S. PATENT DOCUMENTS

| | | | |
|---|---|---|---|
| 3,821,704 | 6/1974 | Sabsay | 380/25 |
| 4,509,093 | 4/1985 | Stellberger | 361/172 |
| 4,558,175 | 12/1985 | Genest et al. | 380/25 |
| 4,596,985 | 6/1986 | Bongard et al. | 340/825.69 |
| 4,625,076 | 11/1986 | Okamoto et al. | 380/25 |
| 4,736,419 | 4/1989 | Roe | 380/23 |
| 4,757,532 | 7/1988 | Gilham | 380/23 |
| 4,825,210 | 4/1989 | Bachhuber et al. | 340/825.31 |
| 4,837,822 | 6/1989 | Crosley et al. | 380/23 |
| 4,928,098 | 5/1990 | Dannhaeuser | 340/825.56 |
| 4,944,009 | 7/1990 | Micali et al. | 380/46 |
| 5,055,701 | 10/1991 | Takeuchi | 307/10.2 |
| 5,093,860 | 3/1992 | Steinbrenner et al. | 380/21 |
| 5,115,508 | 5/1992 | Hatta | 380/25 |
| 5,136,642 | 8/1992 | Kawamura et al. | 380/21 |

Primary Examiner—Salvatore Cangialosi
Attorney, Agent, or Firm—Michael Grillo

[57] ABSTRACT

A remote operating system for remote-controlled operation of a device provides secure communication of encoded messages between a transmitter (100) and receiver (150) of the system, and provides automatic re-synchronization of the transmitter and receiver without revealing a loss of synchronization to the operator. A pseudo random binary number (PRBN) generator (105) in the transmitter (100) produces a sequence of identification numbers. Each time the transmitter (100) is activated, the identification number contained in the transmitted encoded message is selected as the next number in the sequence of identification numbers. A PRBN generator (170) in the receiver (150) produces a sequence of reference numbers that is identical to the sequence of identification numbers. The receiver responds to a command code portion of the transmitted encoded message for operation the device when there is identity between the reference number and the identification number. The receiver (150) responds to the transmitted message when there is not identity between the reference number and the identification number provided that a reference number identical to the identification number is generated within a search length in the sequence of reference numbers, thereby providing automatic re-synchronization of the transmitter and receiver. If a reference number matching the identification number is not found within the search length, the transmitter is controlled to produce a re-synchronization signal for re-synchronizing the receiver to the transmitter.

23 Claims, 9 Drawing Sheets

TABLE OF BINARY NUMBERS
GENERATED BY MAXIMAL LENGTH
PSEUDO RANDOM NUMBER GENERATOR
USING POLYNOMIAL $x^5+x^2+1$

| SELECTION COUNT | PRBN SELECTION | DECIMAL SELECTION |
|---|---|---|
| Initial seed | 11111 | 31 |
| 1 | 11011 | 27 |
| 2 | 10011 | 19 |
| 3 | 00011 | 3 |
| 4 | 00110 | 6 |
| 5 | 01100 | 12 |
| 6 | 11000 | 24 |
| 7 | 10101 | 21 |
| 8 | 01111 | 15 |
| 9 | 11110 | 30 |
| 10 | 11001 | 25 |
| 11 | 10111 | 23 |
| 12 | 01011 | 11 |
| 13 | 10110 | 22 |
| 14 | 01001 | 9 |
| 15 | 10010 | 18 |
| 16 | 00001 | 1 |
| 17 | 00010 | 2 |
| 18 | 00100 | 4 |
| 19 | 01000 | 8 |
| 20 | 10000 | 16 |
| 21 | 00101 | 5 |
| 22 | 01010 | 10 |
| 23 | 10100 | 20 |
| 24 | 01101 | 13 |
| 25 | 11010 | 26 |
| 26 | 10001 | 17 |
| 27 | 00111 | 7 |
| 28 | 01110 | 14 |
| 29 | 11100 | 28 |
| 30 | 11101 | 29 |
| 31 | 11111 | 31 |
| SEQUENCE REPEATING | | |
| 32 | 11011 | 27 |
| 33 | 10011 | 19 |
| 34 | 00011 | 3 |
| 35 | 00110 | 6 |

REMOTE OPERATING SYSTEM HAVING SECURE COMMUNICATION OF ENCODED MESSAGES AND AUTOMATIC RE-SYNCHRONIZATION

DESCRIPTION

1. Technical Field

The present invention relates to remote operating systems, and more particularly to a remote operating system having a transmitter and a receiver for secure communication of encoded messages and having means for synchronization and automatic re-synchronization of the transmitter and receiver.

2. Background Art

Remote operating systems comprising a portable or hand-held transmitter (Fob) and a corresponding receiver for remote-controlled operation of a device are well known. Such systems are commonly used on automobiles for remote operation of automobile door locks, interior lighting, alarm systems, seat positioning, and a plurality of other such functions. In a typical system, upon activation of the transmitter, a coded signal, e.g., a radio-frequency, infrared, or ultrasonic signal, is emitted which is received by the receiver. The receiver is connected for communication with the device to be operated, and provides the received signal to the device, either directly or via a microprocessor, so that the desired function is carried out.

Figure 1:
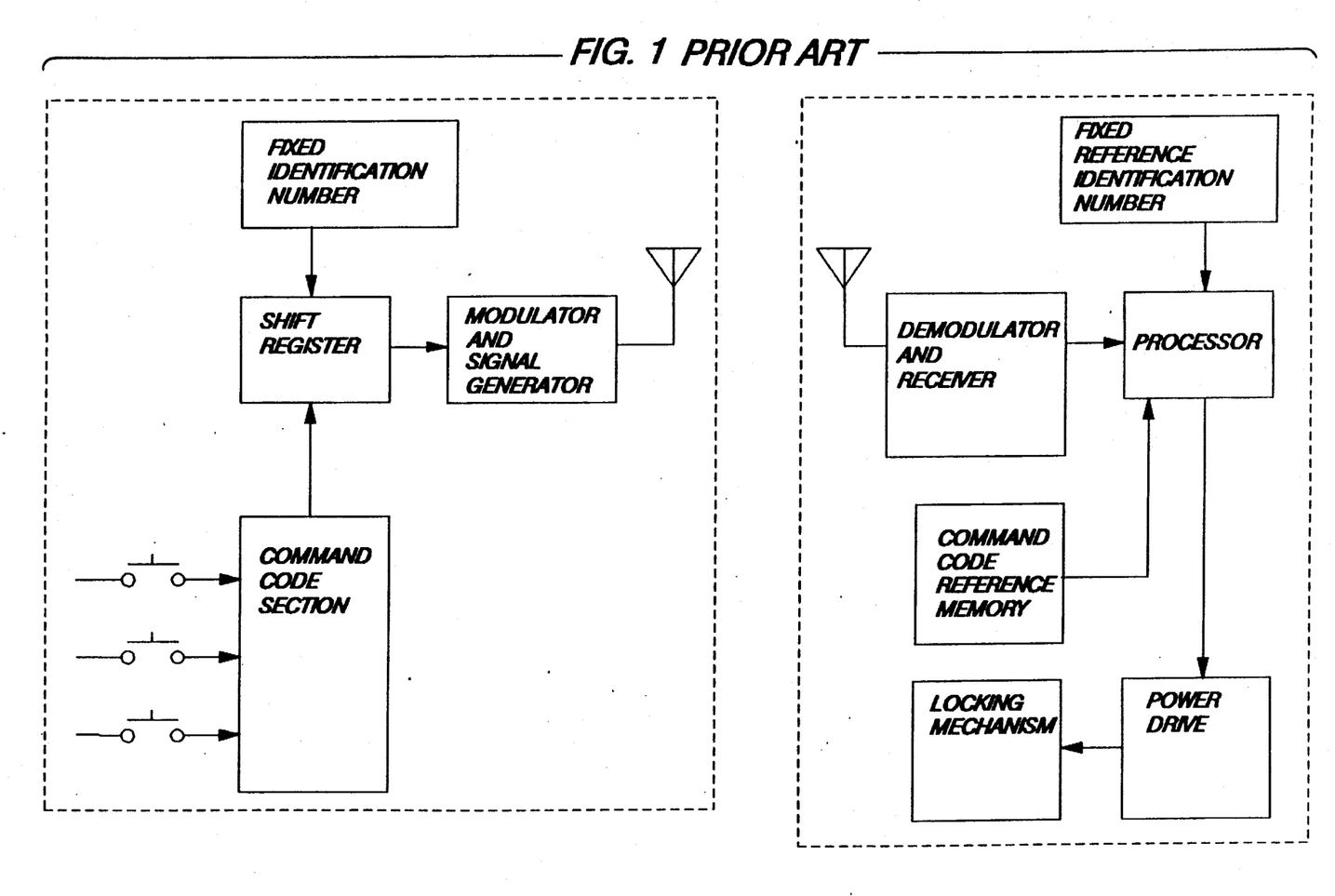
FIG. 1 is a schematic block diagram of a prior art transmitter and receiver having a fixed identification number.

In early remote operating systems, the coded signal contained fixed identification information, e.g., a fixed identification number or code, to identify the transmitter to the receiver. The identification code is appended to an encoded command corresponding to the desired function to be carried out. Therefore, each time the Fob is used to command an action be taken, the same identification code is used. This type of system is shown in FIG. 1. The problem with a system of this type is that someone skilled in the art can clandestinely capture the message and rebroadcast it at a later time, thereby achieving unauthorized command or operation of the system.

Figure 2:
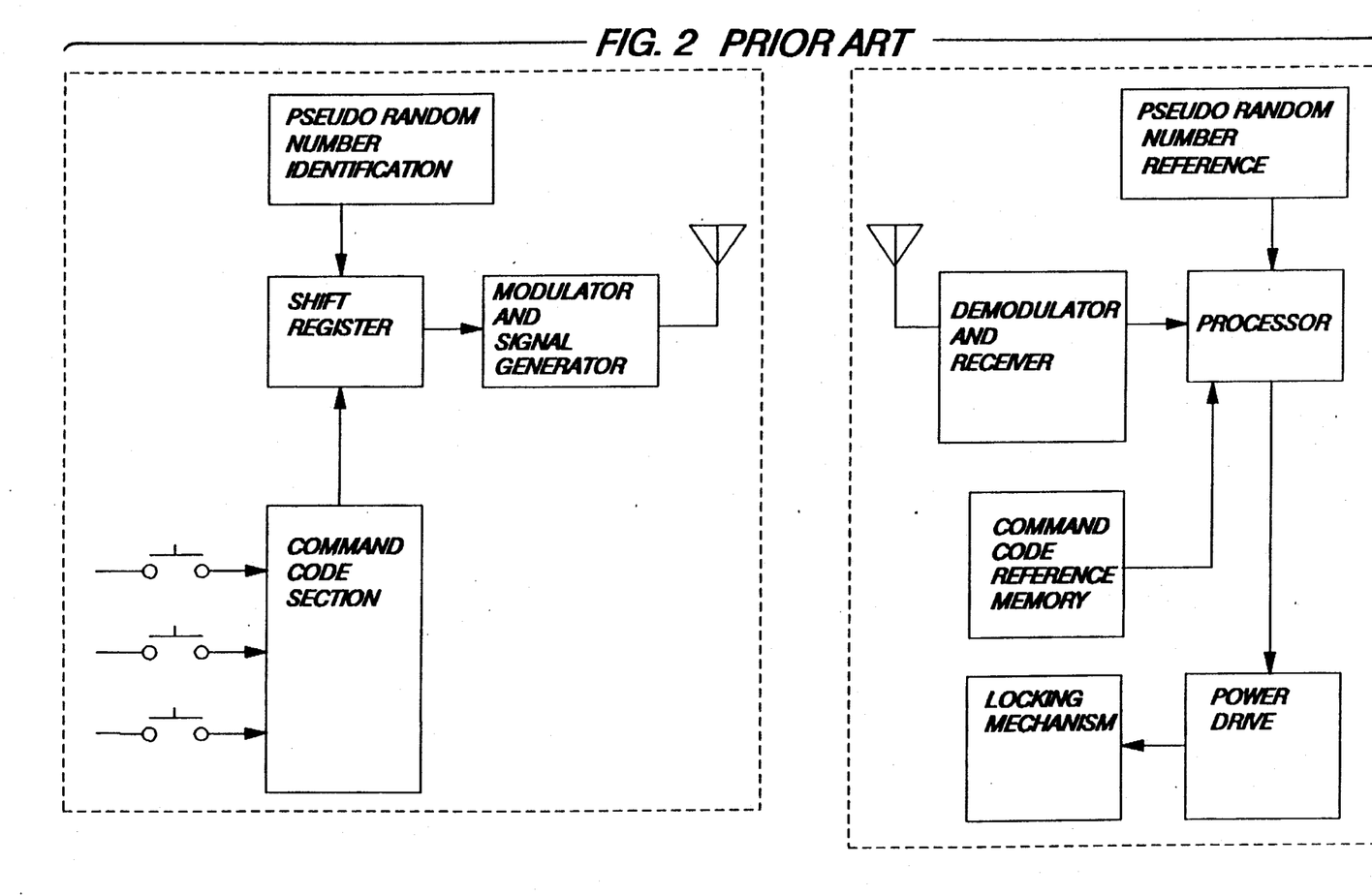
FIG. 2 is a schematic block diagram of a prior art transmitter and receiver having a pseudo random number identification number.

In response to the problem identified above, remote operating systems have been developed that change the identification code each time the Fob is used. The Fob is configured to transmit one in a sequence of identifications codes, and the receiver is configured to reproduce an identical sequence of identification codes for comparison to the transmitted codes. This is accomplished for example by providing both the transmitter and receiver with a pseudo-random number generator, implemented either in microprocessor software or other alternative methods including combinations of digital hardware, analog circuitry, etc. This type of system is shown in FIG. 2. When there is identity between the receiver code and the transmitted code, the encoded command is provided to the device to be operated so that the desired function is carried out. Security of such a system is dependent on having a large number of different identification codes in the sequence of codes. Additionally, security is dependent upon the sequence being produced in such a way that the next number in the sequence cannot be predicted by merely examining the previous numbers in the sequence.

In U.S. Pat. No. 4,825,210 to Bachhuber et al., an electronic locking system is disclosed wherein the transmitter transmits one in a sequence of coded identification signals (marks), and the receiver compares the transmitted mark to a reference mark supplied by a reference number generator. When the receiver recognizes identity between the sequence of transmitted marks and reference marks, the reference number generator is synchronized to the last transmission mark of the transmission sequence and the device, e.g., lock, is operated. A problem with the mark generation method disclosed in the Bachhuber el al. patent is that the length of the sequence of marks may be very limited. Therefore, someone skilled in the art can predict the future marks in the sequence from analyzing the previously transmitted marks. For example, a mark of U.S. Pat. No. 3,831,017 with a HAZ of zero produces only a seven number sequence in the Bachhuber et al. mark generator. Additionally, it can be shown that under certain circumstances, the Bachhuber el al. mark generator stops generating new marks. For example, when the HAZ value is two and a mark of three is generated, the method never stops generating a three as the new mark.

Another problem associated with remote operating systems of the type having an identification code that is changed each time the system is used is that the communication links used in these systems often fail to communicate the coded identification signal to the receiver. When this occurs, the transmitter selects the next signal in the series of signals while the receiver remains at the previous selection. Thereafter, the receiver fails to responds to the transmitted command until the operator takes action to return both the transmitter and receiver to the same signal in the series of identification signals. The failure of the receiver to respond to the transmitted command is referred to as "loss of synchronization" and the action taken by the operator to return both the transmitter and receiver to the same signal in the series of identification signals is referred to as "re-synchronization".

U.S. Pat. No. 4,569,985 to Bongard et al. discloses a remote-control lock system wherein the transmitter transmits one of a series of coded identification signals, and the receiver is set to respond to the one of the signals. Thereafter, the transmitter and receiver are reset to the next signal in the series of signals until the pattern repeats. The Bongard et al. patent suggests a number of re-synchronization methods, such as transmitting a synchronization signal which causes the receiver to reset to the next signal in the series until the transmitter and receiver are re-synchronized. Another re-synchronization method suggested in the Bongard et al. patent is providing a special "auxiliary signal", outside the series, for resetting the receiver to a predetermined signal in the series. While effective, these methods are cumbersome to the user and may prove confusing to the user that doesn't realize the failure of the remote operation is caused by a loss of synchronization.

U.S. Pat. No. 4,509,093 to Stellberger discloses another method in solving the loss of synchronization problem by implementing a bi-directional, half duplex communication link. Although the system is convenient to the user, it is expensive to provide a transmitter and receiver in both the hand-held Fob and at the location of the device to be operated.

U.S. Pat. No. 4,928,098 to Dannhaeuser also deals with the loss of synchronization problem. Dannhaeuser requires two transmissions to confirm the authorization of a transmitter after a loss of synchronization. For example, whenever a transmission is lost, the next transmission appears to the user to have also been lost. This is because the second transmission (which is the first to be received by the receiver) is used to re-synchronize the number generators in the transmitter and receiver. Finally, the third transmission is accepted. Hence, if a transmitter is actuated out of range of the receiver, the unit appears to miss the next transmission no matter what the range is between the transmitter and the receiver.

DISCLOSURE OF THE INVENTION

Objects of the present invention include provision of an improved remote operating system which provides secure communication of encoded messages between a transmitter and receiver of the system, and which provides automatic re-synchronization of the transmitter and receiver without revealing a loss of synchronization to the operator.

According to the present invention, a transmitted message contains a transmitter identification number which is one in a sequence of identification numbers, the length of the sequence of identification numbers being mathematically provable, the sequence of identification numbers being of a character such that the next number in the sequence of identification numbers cannot be predicted by analyzing the previous numbers in the sequence, the sequence of identification numbers being sufficiently large so as to provide security of the identification numbers, the identification number contained in the transmitted message being selected as the next number in the sequence of identification numbers each time the transmitter is actuated; and a receiver is provided with a reference number from a sequence of reference numbers, the sequence of reference numbers being identical to the sequence of identification numbers, the receiver responding to the transmitted message when there is identity between the reference number and the identification number, the receiver selecting the next reference number from the sequence of reference numbers each time the receiver responds to a transmitted message.

According to a first aspect of the invention, the sequence of identification numbers and reference numbers is provided by maximal length pseudo random binary number (PRBN) generators built around a prime polynomial which is both irreducible and primitive, the length of the sequence being determined by the order of the prime polynomial. According to a second aspect of the invention, the sequence of identification numbers and reference numbers is provided by PRBN generators built around a generator polynomial, the length of the sequence being determined by the order of a generator denominator polynomial which is a prime polynomial that is both primitive and irreducible, the sequence being a subset of a larger sequence of numbers the length of which being determined by the order of the generator polynomial. According to a third aspect of the present invention, the sequence of identification numbers and reference numbers is provided by pairs of PRBN generators which each provide a sequence of pseudo random binary numbers, each number in the sequence of combining consecutive pairs of pseudo random binary numbers from the PRBN generator pairs.

In further accord with the present invention, the sequence of identification and reference numbers is provided by selecting a portion or subset of the bits from the total bits of each pseudo random binary number in the sequence of numbers.

In still further accord with the present invention, the receiver responds to the transmitted message when there is not identity between the reference number and the identification number provided that a reference number identical to the identification number is generated within a defined range of numbers in the sequence of reference numbers, i.e., the search length, thereby providing automatic re-synchronization of the transmitter and receiver.

In further accord with the present invention, upon a loss of synchronization, and a reference number matching the identification number is not found within the search length, the transmitter is controlled to provide a re-synchronization signal which comprises a count signal indicative of the number of identification numbers in the sequence of identification numbers that have been transmitted by the transmitter less a random number less than the search length, the receiver being responsive to the re-synchronization signal for selecting the reference number in the sequence of reference numbers corresponding to the count signal, thereby re-synchronizing the receiver to the transmitter.

The PRBN generators may be implemented in a variety of ways including dedicated digital hardware or by analog hardware if desired. Additionally, the PRBN generators may be implemented by employing a known type of microprocessor for performing algorithmic subroutines in accordance with the general equivalence between software and dedicated digital hardware and software, as is well known to those in the art.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The remote operating system of the present invention is particularly well suited for secure communication of encoded messages between a transmitter and receiver of the system, and for automatic re-synchronization of the transmitter and receiver without revealing a loss of synchronization to the operator. The system of the present invention may be used in a variety of applications requiring operation of a device from a remote location; however, for ease of description and understanding, the present invention will be described as it would be used for the remote operation of automobile door locks.

Figure 3:
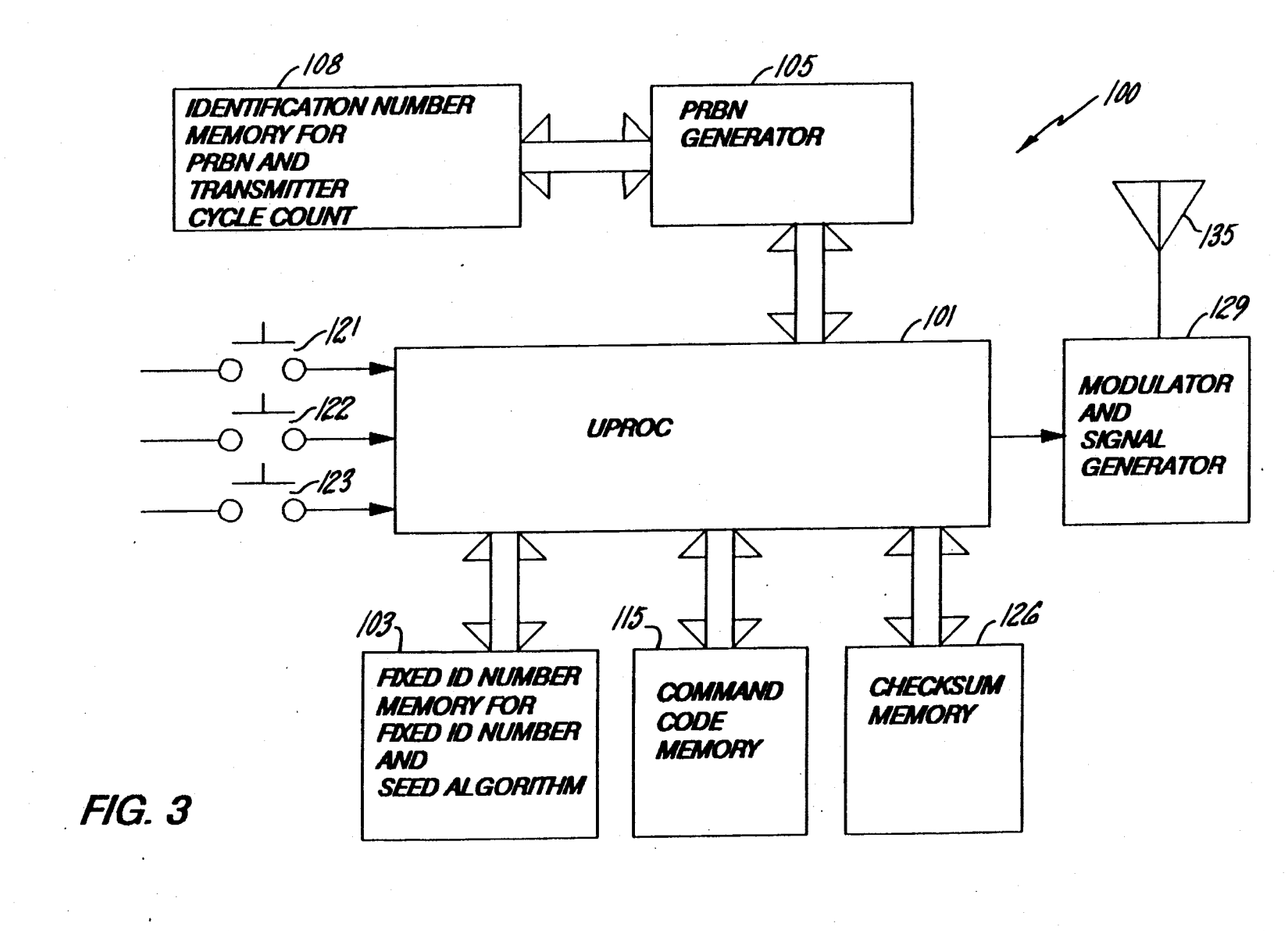
FIG. 3 is a schematic block diagram of a transmitter having a pseudo random identification number in accordance with the present invention.
Figure 4:
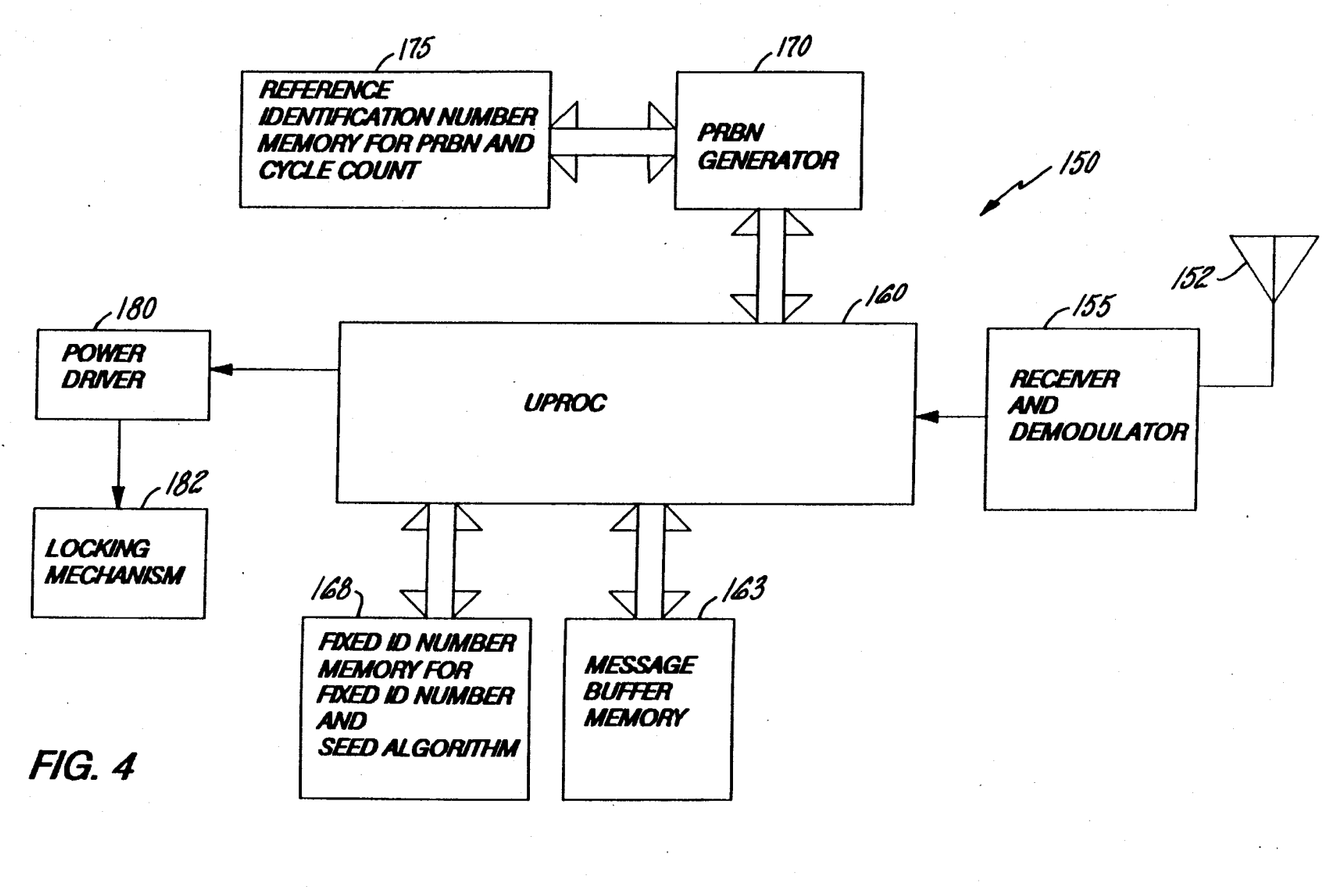
FIG. 4 is a schematic block diagram of a receiver corresponding to the transmitter of FIG. 3 having a pseudo random reference number and automatic re-synchronization in accordance with the present invention.

One embodiment of the remote operating system of the present invention is shown in FIGS. 3 and 4, a transmitter portion of the system being shown in FIG. 3 and a receiver and operation portion of the system being shown in FIG. 4. During operation of the system, encoded messages are provided by the transmitter and received by the receiver. If the receiver identifies the encoded message as a valid communication, the automobile door locks are operated as directed by the encoded message.

Each encoded message contains four parts. A fixed identification (ID) number portion of the message is used to uniquely identify the transmitter to its mated receiver. A command code portion of the message corresponds to the action to be carried out by the device being operated, e.g., position the door locks in a locked or unlocked position. A pseudo random binary number (PRBN) portion of the message contains an identification number which is one in a sequence of identification numbers. Each time the transmitter is actuated, the next number in the sequence of identification numbers is provided in the PRBN portion of the message. Finally, a check sum portion of the message is provided to verify error-free receipt of the transmitted message.

Referring to FIG. 3, the transmitter 100 is built around a microprocessor 101 for performing the various functions required to produce and transmit the encoded message. The transmitter is provided with an ID memory 103 for storing a fixed ID number, e.g., a 20-bit binary number. The ID memory 103 is a non-volatile memory, e.g., an EEPROM, and therefore the fixed ID number remains in the ID memory 103 until the memory is reprogrammed.

The transmitter is also provided with a PRBN generator 105 which will be described in greater detail with respect to FIGS. 6, 7, and 8. For proper operation, the PRBN generator 105 must be initialized with a number called a "seed" number. This is typically accomplished when the transmitter is manufactured. From then on, each time the transmitter is actuated, the next identification number (pseudo random binary number) in the sequence of identification numbers is provided by the PRBN generator. The seed number may be provided by manipulating the 20 bit fixed ID number stored in the ID memory 103. This is accomplished by providing the microprocessor 101 with a mathematical seed algorithm which converts the fixed ID number to the seed number. For additional security, the PRBN generator is cycled a random number of times before the transmitter transmits its first encoded message. This prevents someone from discovering the seed number during factory testing of the transmitter. The seed algorithm is stored in the ID memory 103 with the fixed ID number.

An identification number memory 108 is also provided for storing the current identification number in the sequence of identification numbers, and a cycle count corresponding to the number of times that the PRBN generator has been cycled. The identification number memory 108 is also preferably a non-volatile memory. When a new identification number is provided by the PRBN generator 105, it is stored in the identification number memory 108. If for some reason the identification number memory 108 cannot store the new value, the old value is not deleted and the transmitter does not transmit an encoded message. This may occur with some types of memory devices at low temperatures, e.g., EEPROMs.

The transmitter 100 is provided with a command code memory 115 for storing a plurality of command code signals. The operator commands the transmitter to send a message by depressing one of a plurality of switches 121, 122, 123 mounted on the transmitter, and in response, the microprocessor 101 encodes the command code signal and stores the value in the command code memory 115. At this point, the microprocessor can calculate the check sum or other suitable error detecting code by adding together the identification number, the fixed ID number and the command code. The microprocessor then stores the check sum in a check sum memory 126.

Once all the bits of the encoded message are known, the microprocessor 101 serializes the bits and provides the encoded message to a modulator and signal generator 129 which modulates a radio frequency signal with the encoded message. The modulated signal is thereafter emitted by an antenna 135.

Referring to FIG. 4, the receiver 150 is provided with an antenna 152 for receiving the signal transmitted by the transmitter 100 and providing the received signal to a receiver and demodulator portion 155 of the receiver. The demodulated signal is thereafter provided to a receiver microprocessor 160 which decodes the received signal into a received message and stores the received message in a message buffer memory 163.

Next, the microprocessor 160 calculates a check sum for the received message and compares this with the received check sum. If the two check sums are different, the message is discarded. However, if the two check sums are the same, the microprocessor 160 searches a receiver ID memory 168 to determine if the fixed ID number contained in the received message is the same as the fixed ID number in the receiver ID memory 168. During manufacture, the receiver ID memory 168 is provided with the same fixed ID number as the corresponding transmitter so that the receiver will only respond to messages transmitted by a transmitter having an identical fixed ID number. Additionally, the receiver ID memory 168 is provided with the identical seed algorithm contained in the transmitter ID memory 103 for use in providing a seed number to a receiver PRBN generator 170.

If the fixed ID number in the receiver ID memory 168 is the same as the fixed ID number in the received message, the receiver microprocessor 160 checks if the command code portion of the message is a re-synchronization message. The re-synchronization message is only present when the operator initiates manual re-synchronization of the receiver and transmitter as described in greater detail hereinafter. If the command code does not contain a re-synchronization message, the microprocessor 160 continues to validate the message by retrieving a reference identification number stored in a reference identification number memory 175 of the receiver 150, and providing this number to the PRBN generator 170 to produce the next reference identification number in the sequence of identification numbers. The PRBN generators 105, 170 in the transmitter 100 and receiver 150 are identical, and the next reference identification number is the expected value of the identification number in the received message. If there is a match between the received identification number and the next reference identification number, the command code portion of the received message is decoded by the microprocessor. The microprocessor then directs that the appropriate action is taken, e.g., the microprocessor provides a signal to a power driver 180 for positioning a locking mechanism 182 as directed by the command code. The final step is to replace the reference identification number in the reference identification number memory 175 with the next reference identification number, and increment a receiver cycle count stored in the reference identification number memory 175.

If the next reference identification number and the received message identification number do not match, the receiver microprocessor 160 cycles the receiver PRBN generator 170 and compares the new selection with the received message identification number. If there is now a match, the command code is decoded and the appropriate action is taken. The matching reference identification number is then stored in the reference identification number memory 175. If there is not a match, the receiver microprocessor 160 will continue to cycle the receiver PRBN generator 170 to search for a match until a maximum search length has been reached, e.g., 100 cycles of the receiver PRBN generator 170. The search length is selected to cycle the receiver PRBN generator 170 a sufficient number of times to allow re-synchronization of the receiver to the transmitter if a large number of transmitter transmissions have been lost, while being short enough to provide security from unauthorized operation of the system.

Only when the receiver PRBN generator is cycled past the search length without finding a match between the received message identification number and the reference identification number is the operator required to take action to re-synchronize the receiver to the transmitter. Referring to FIGS. 3 and 4, the operator is required to simultaneously depress two switches on the transmitter to initiate manual re-synchronization of the receiver to the transmitter. The switches on the transmitter include for example a LOCK DOORS switch, an UNLOCK DOORS switch and a TRUNK RELEASE switch.

Once manual re-synchronization is initiated, the transmitter enters a continuous transmission mode in which it alternates between transmitting a first message and a second message. The first message is a re-synchronization message having a special command code that identifies it as a re-synchronization message. The second message is a validation message which contains a normal command code corresponding to the LOCK DOORS command. The LOCK DOORS command is used so that if the re-synchronization signal is clandestinely captured, it can not be used to gain unauthorized access to the locked area.

The pseudo random binary number portion of the re-synchronization message contains a count signal which is the cycle count from the transmitter identification number memory 108 less a security number. The security number is a random number of a magnitude less than the search length, e.g., a number between one and 99. If the receiver microprocessor 160 detects the re-synchronization command after validating the check sum and fixed ID number, the microprocessor 160 sets the receiver cycle count equal to zero, and uses the seed algorithm and the fixed ID number to provide the seed number to the receiver PRBN generator 170. The receiver PRBN generator 170 is then cycled until the receiver cycle count equals the re-synchronization command count signal, i.e., the receiver cycle count equals the transmitter cycle count less the security number.

The receiver can now validate the second encoded message as described hereinbefore by searching for a reference identification number corresponding to the received message identification number. When a match is found within the search length, the command code is decoded and the appropriate action is taken, e.g., the doors are locked. The reference identification number is then stored in the reference identification number memory 175.

Once the re-synchronization procedure is completed as indicated by the re-positioning of the automobile door locks, the transmitter may be taken out of the re-synchronization mode by depressing any one of the switches on the transmitter. Alternatively, upon activation of the re-synchronization mode by simultaneously depressing two switches on the transmitter, the transmitter may be programmed to provide the re-synchronization signal. Next, the transmitter waits a period of time equivalent to the time it takes for the receiver to be cycled a number of times equal to the count signal prior to transmitting the second message. Thereafter, the transmitter automatically terminates the re-synchronization mode, and no further action is required on the part of the operator.

Figure 5:
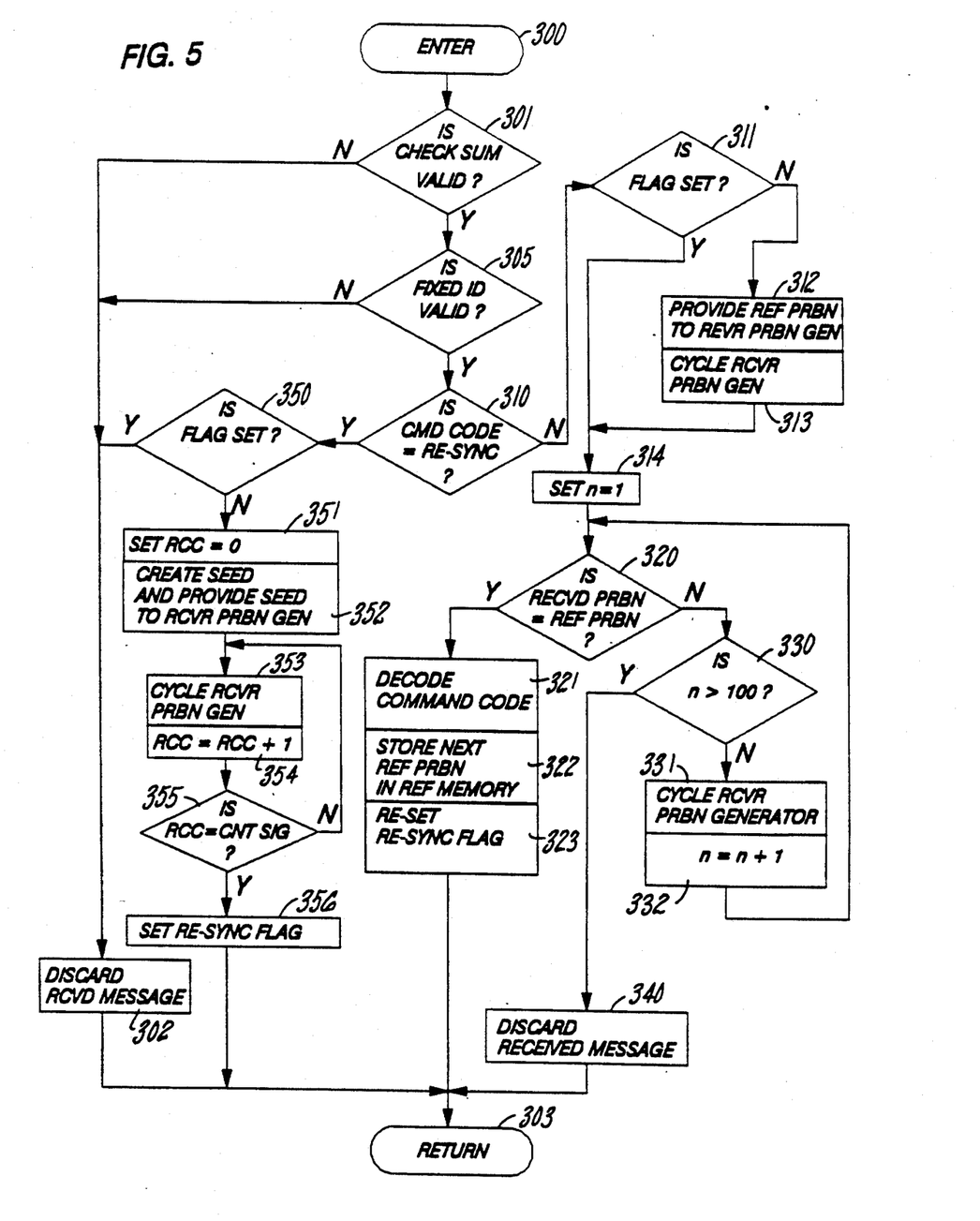
FIG. 5 is a flow diagram of a routine executed by a receiver microprocessor for implementing remote operation and re-synchronization in accordance with the present invention.

The validation and re-synchronization procedure used by the receiver may be implemented with a simple computer program of the type illustrated in FIG. 5, such routine being performable by the receiver microprocessor 160. Upon initial energization of the receiver, a re-synchronization flag is re-set as an initial condition. Referring to FIG. 5, when the receiver receives an encoded message, the program is entered in a step 300, and the microprocessor checks if the check sum is valid in a test 301. If the results of the test 301 are negative, a valid message has not been received, and the received message is discarded in a step 302. The subroutine then returns in the step 303. If the results of the test 301 are positive, the microprocessor checks if the received fixed ID number is the same as the fixed ID number stored in the receiver fixed ID memory in a test 305. If the results of the test 305 are negative, the encoded message was not transmitted by a transmitter having a valid fixed ID number, and the received message is discarded in the step 302. The subroutine then returns in the step 303.

If the results of the test 305 are positive, the microprocessor checks if the command code contains a re-synchronization message in a test 310. A re-synchronization message will only be present when the operator initiates manual re-synchronization of the transmitter and receiver, and negative results of the test 310 reach a test 311 wherein the microprocessor checks if the re-synchronization flag is set. The re-synchronization flag was re-set as an initial condition upon energization of the receiver, and the negative results of the test 311 reach the steps 312 through 314 wherein the reference identification number stored in the reference identification number memory is provided to the receiver PRBN generator, the PRBN generator is cycled to generate the next reference identification number, and a search length counter, n, is set equal to 1. Next, the microprocessor checks if the received identification number is equal to the next reference identification number in a test 320.

If the results of the test 320 are positive, the received message has been completely validated, and steps 321 through 323 are consecutively performed wherein the command code is decoded and the commanded action is carried out, the next reference identification number is stored in the reference identification number memory and the re-synchronization flag is re-set. The subroutine then returns in the step 303.

If the results of the test 320 are negative, the microprocessor checks if the search length counter is greater than or equal to 100 in a test 330. The counter was set equal to one in the step 314, and the negative results of the test 330 reach the steps 331 and 332 wherein the receiver PRBN generator is cycled to generate the next reference number in the sequence, and the search length counter is incremented. The subroutine then returns to the test 320 wherein the microprocessor again checks if the received identification number is equal to the reference identification number. If the results of the test 320 are now positive, the steps 321 through 323 are consecutively performed as described hereinabove. However, if the results of the test 320 are again negative, the subroutine reaches the test 330, the negative results of which reach the steps 331 and 332. If a reference number is not found within the search length as defined in the test 330, e.g., 100 cycles of the receiver PRBN generator, the results of the test 330 will be positive reaching a step 340 wherein the received message is discarded. The subroutine then returns in the step 303.

If the operator initiates manual re-synchronization of the transmitter and receiver by simultaneously depressing two switches on the transmitter, the results of the test 310 will be positive, reaching a test 350 wherein the microprocessor checks if the re-synchronization flag is set. The re-synchronization flag is re-set as an initial condition of energizing the receiver, and therefore the negative results of the test 350 reach the steps 351 and 352 wherein the receiver cycle count (RCC) is set equal to zero, and the receiver fixed ID number and seed algorithm are used by the receiver microprocessor to generate a seed number which is provided to the receiver PRBN generator. Next, steps 353 and 354 are performed wherein the receiver PRBN generator is cycled and RCC is incremented. The microprocessor then checks if RCC equals the count signal in a test 355. If the results of the test 355 are negative, the subroutine again performs the steps 353 and 354. Once the receiver PRBN generator has been cycled a number of times equal to the count signal, the results of the test 355 will be positive reaching a step 356 wherein the re-synchronization flag is set. The subroutine then returns in the step 303. If the receiver again receives the re-synchronization signal prior to receiving a valid message, the results of the test 350 will be positive, and the message is discarded in the step 302. The subroutine then returns in the step 303.

. If a valid message is received after the re-synchronization signal is received, the negative results of the test 310 reach the test 311 wherein the microprocessor checks if the re-synchronization flag is set. Since the re-synchronization flag was set in the step 356, the positive results of the test 311 reach the step 314 wherein the search length counter is set equal to 1. Thereafter, the subroutine will attempt to validate the received identification number in the tests and steps 320 through 332. The routine should find a match between the received identification number and the reference identification number within the search length because the difference between the count signal used in test 355 and the transmitter cycle count is the security number, i.e., a random number of a magnitude less than the search length as described hereinabove.

Once the operator verifies that the transmitter and receiver are re-synchronized, as indicated by the receiver responding to the second message, the operator may terminate the manual re-synchronization mode by momentarily depressing any switch on the key pad.

The transmitter and receiver PRBN generators should be implemented such that they both produce an identical sequence of numbers, the sequence of numbers being of a character such that the next number in the sequence cannot be predicted by analyzing the previous numbers in the sequence, and the sequence should be sufficiently large so as to provide security of the numbers. The PRBN generators of the present invention use a mathematics derived from Galois Field Arithmetic to produce the desired sequence of numbers. A discussion of Galois Field Arithmetic can be found in *An Introduction to Error-Correcting Codes*, Shu Lin. Prentice Hall Inc., Englewood Cliffs, N.J. (1970), and in *Error-control Techniques for Digital Communication*, A.M. Michelson and A.H. Levesque, John Wiley and Sons Inc., New York, N.Y. (1985).

A first method of implementing the transmitter and receiver PRBN generators is using a maximal length PRBN generator. A maximal length PRBN generator is built around a "prime polynomial" that is mathematically primitive and irreducible, and produces a series of binary numbers. A polynomial is irreducible if it is not divisible by any other polynomial with a degree greater than zero and less than the degree of the polynomial in question. A polynomial is primitive if all of the elements of the Galois Field $GF(2^n)$ are produced by raising the polynomial to the powers from zero to n. Prime polynomials of the type describe hereinabove are known to those skilled in the art, see, e.g., *An Introduction to Error-Correcting Codes*, Shu Lin, Prentice Hall Inc., Englewood Cliffs, N.J. (1970), 18. Primitive irreducible polynomials of lengths up to 34 have been tabulated, see, e.g., *Errorcontrol Techniques for Digital Communication*, A.M. Michelson and A.H. Levesque, John Wiley and Sons Inc., New York, N.Y. (1985), Appendix B.

The order of a maximal length PRBN generator is dependant upon the order of the prime polynomial that it is built around. Additionally, the number of binary numbers in the set of binary numbers produced by the maximal length PRBN generator is dependant upon the order of the prime polynomial. A maximal length PRBN generator of order n will produce $2^n-1$ binary numbers in the set. Each time the generator is cycled, it selects a different number from the set of numbers, and the sequence does not repeat until the $2^{nth}$ selection.

The maximal length PRBN generator must first be provided with a seed number before it will begin to generate pseudo random binary numbers. Thereafter, each time the generator is cycled, a new number from the set of numbers is selected. Only after all of the numbers in the set of numbers are selected is the original seed selected by the generator. Two maximal length PRBN generators using the same polynomial, seed and cycle count produce the same pseudo random binary number selection.

One method of implementing a maximal length PRBN generator is using a linear feedback shift register (LFSR) 200. Referring to FIG. 6, a generic LFSR 200 is shown which may be used to implement an $n^{th}$ order maximal length PRBN generator. The LFSR 200 comprises a plurality of flip-flops 205, each flip-flop corresponding to a bit of the shift register, $SR_i$ where $i=1,2,\ldots,n$. The flip-flops 205 are separated by exclusive or (XOR) gates 207, and each flip-flop receives feedback from the $n^{th}$ shift register via multipliers $P_i$ 210. A clock signal is provided on a line 215 to cycle each of the flip-flops 205.

A LFSR of length n consists of n flip-flops and up to $n-1$ XOR gates. The multipliers $P_i$, $i=0,1,\ldots,n-1$, must be the coefficients of a prime polynomial, and therefore are either 0 or 1 as required to implement the prime polynomial. The shift register must also have circuitry that allows it to be initialized to any seed value other than all zeros. For example, to implement the prime polynomial $x^5+x^2+1$, the multipliers $P_0$ and $P_2$ are set equal to 1, and all of the other multiplier are set equal to zero.

Figure 7:
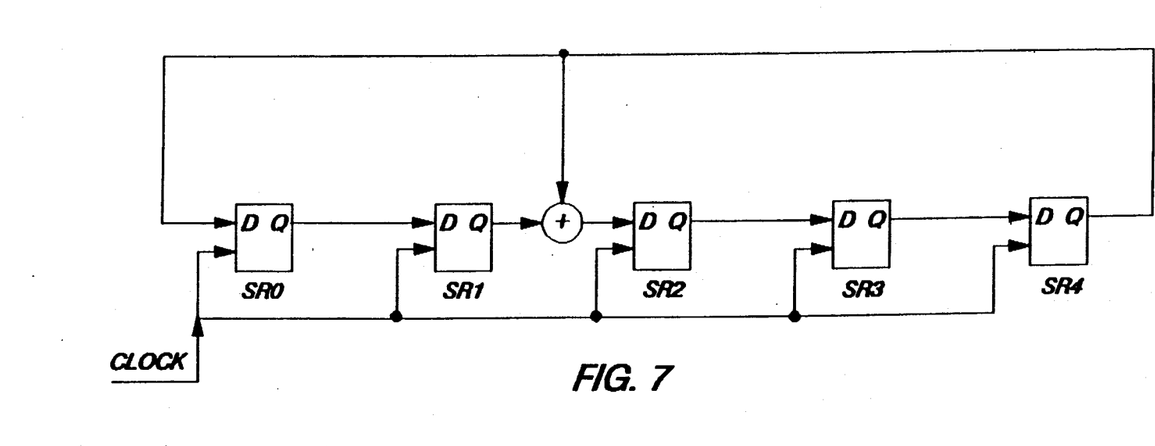
FIG. 7 is a schematic block diagram of a specific LFSR, i.e., built around the prime polynomial $X^5 + x^2 + 1$, for implementing a maximal length pseudo random binary number generator of FIGS. 3 and 4.
Figure 8:
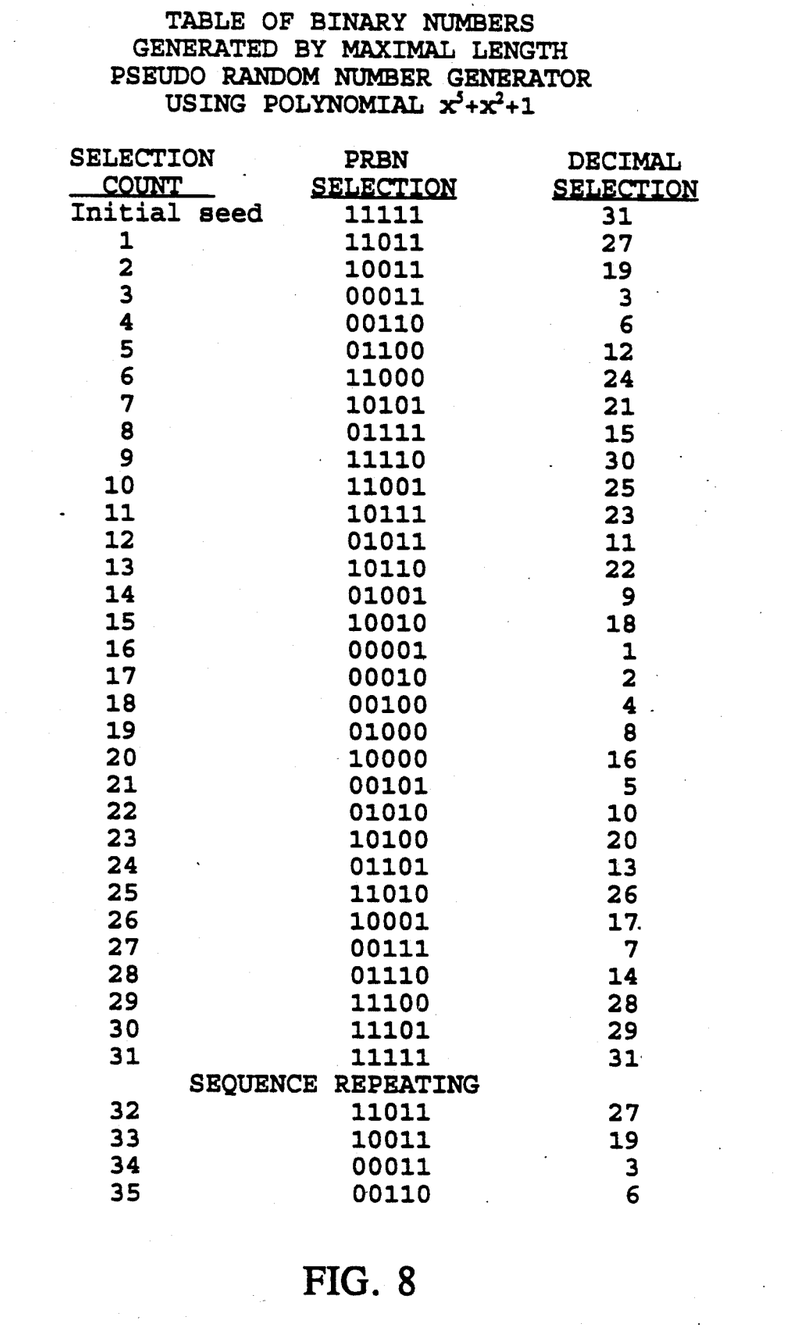
FIG. 8 is a table showing the pseudo random binary numbers produced by the PRBN generator of FIG. 7 when it is initialized with the binary number seed $11111_2$.

Referring to FIG. 7, it will be noted that if the specific prime polynomial to be implemented is known, the multipliers require no circuitry and the XOR gates corresponding to $P_i=0$ may be omitted. The LFSR of FIG. 7 implements the fifth order prime polynomial $x^5+x^2+1$ using no multipliers and only one XOR gate. If the maximal length PRBN generator of FIG. 7 is initialized with a binary number seed of $11111_2$, the first selection of $11011_2$ is produced by providing a clock pulse on the clock input 215. The numbers generated by the maximal length PRBN generator of FIG. 7 when it is initialized with seed $11111_2$ are shown in FIG. 8. Note that the pattern does not repeat until after $2^n-1$, e.g., 31, selections.

The transmitter and receiver PRBN generators may also be implemented with a generator polynomial g(x) that is derived using a prime polynomial P(x) of order n. For example, a generator polynomial may be determined using the following equation:

$$g(x)=(x^m+1)/P(x) \qquad (eq.\ 1)$$

where m is equal to the sequence length, i.e., $2^n-1$. The generator polynomial will produce a sequence of length $2^n-1$ which is a subset of a larger sequence of length $2^{m-n}-1$. Using the prime polynomial $P(x)=x^5+x^2+1$, g(x) is given by the following:

$$g(x)=(x^m+1)/P(x)=x^{31}+1/x^5x^2+1 \qquad (eq.\ 2)$$

$$g(x)=x^{26}+x^{23}x^{21}+x^{20}+x^{17}+x^{16}+x^{15}+x^{14}+x^{13}-x+^9+x^8+x^6+x^5+x^4+x^2+1 \qquad (eq.\ 3)$$

Figure 6:
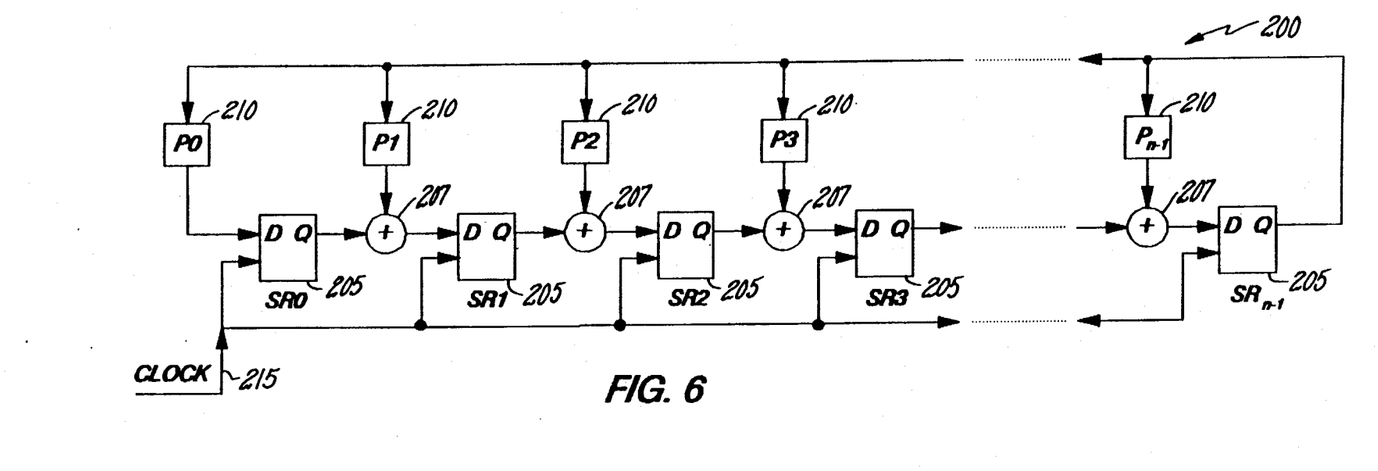
FIG. 6 is a schematic block diagram of a generic linear feedback shift register (LFSR) for implementing a pseudo random binary number generator of FIGS. 3 and 4.

The generator polynomial g(x) is implemented using a LFSR of the type shown in FIG. 6. The LFSR will consist of $m-n$ flip-flops and up to $m-n-1$ XOR gates. The multipliers are either 0 or 1 as required to implement the generator polynomial coefficients. If the specific generator polynomial to be implemented is known, the multipliers require no circuitry and the XOR gates corresponding to $P_i=0$ may be omitted as described hereinbefore with respect to FIG. 7.

Figure 9:
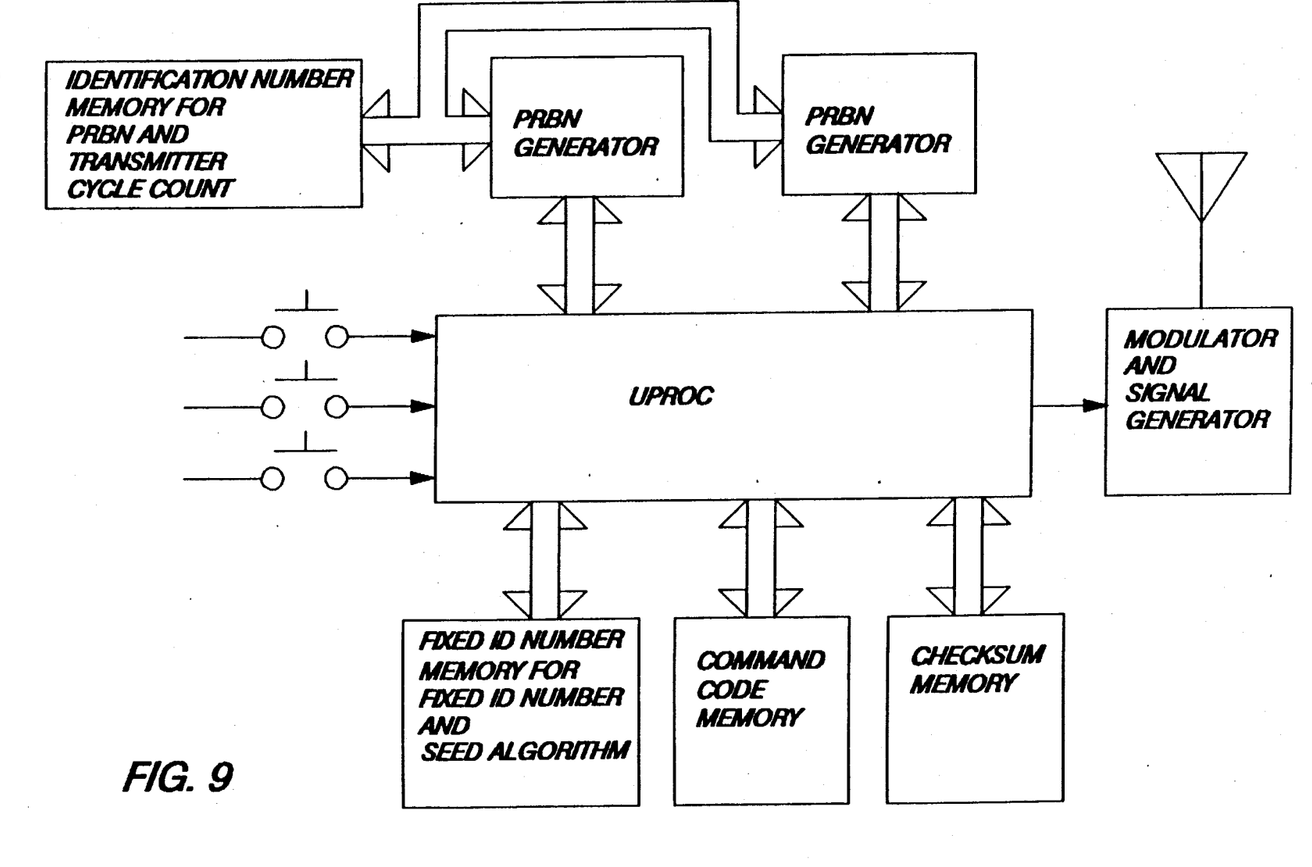
FIG. 9 is a schematic block diagram of an alternative embodiment of the transmitter of FIG. 3.
Figure 10:
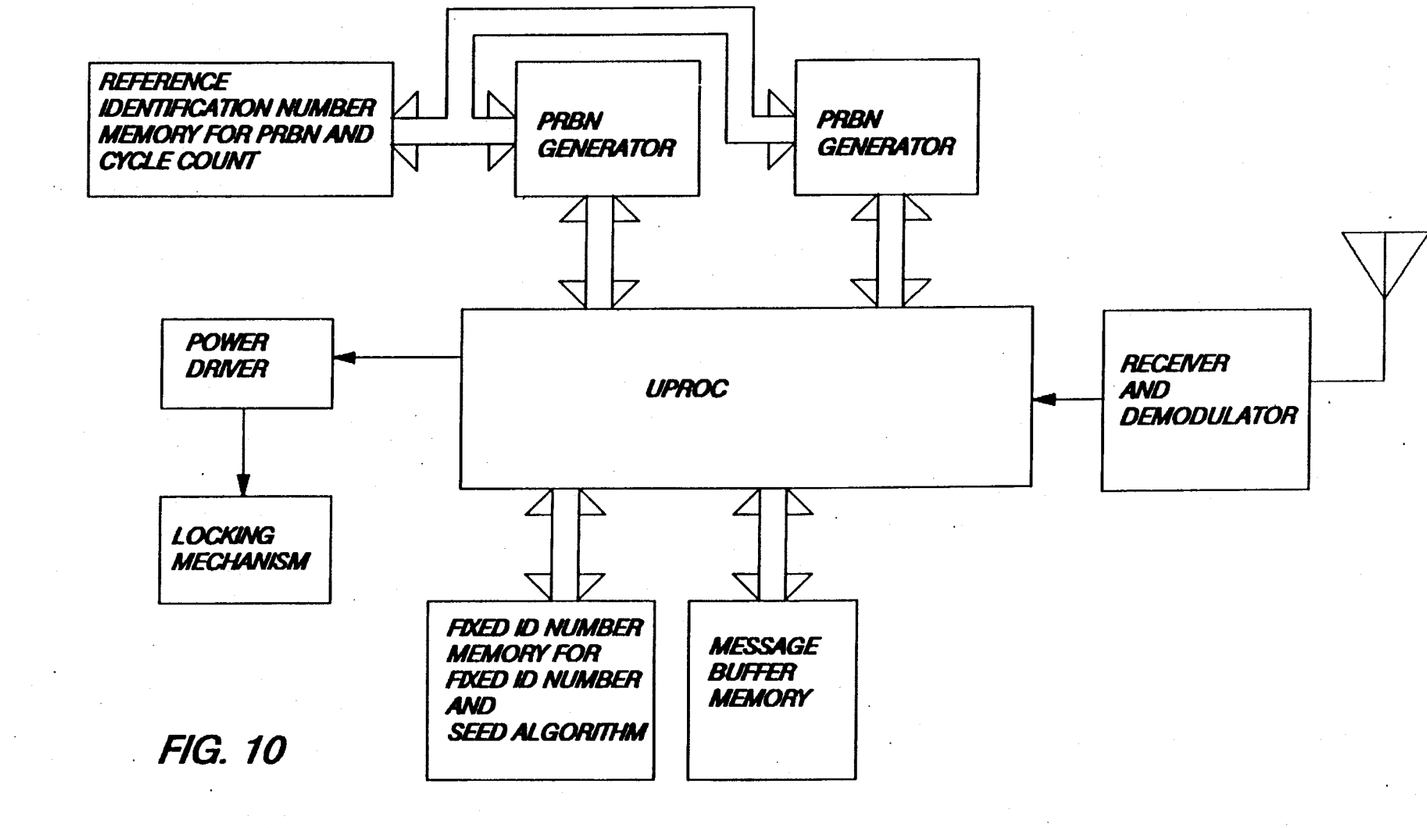
FIG. 10 is a schematic block diagram of an alternative embodiment of the receiver of FIG. 4.

The remote operating system of the present invention has been described thus far as comprising a transmitter and receiver that each comprise a PRBN generator, both generators producing an identical sequence of binary numbers; however, the transmitter and receiver of the present invention may each be provided with a pair of PRBN generators as shown in FIGS. 9 and 10. In this embodiment, the PRBN portion of the encoded message is formed by combining the numbers from the pairs of generators. In the simplest embodiment of this configuration, the pairs of transmitter and receiver PRBN generators are built around the same polynomials, i.e., either a generator polynomial or prime polynomial as described hereinbefore, and are initialized with the same seed number. To provide added security, each PRBN generator in a pair of generators can be configured to produce a different sequence of numbers by either configuring each PRBN generator around a different polynomial or by initializing each PRBN generator with a different seed number, or both.

To provide further security of the PRBN sequence, the transmitter microprocessor may be programmed to select only a subset of the shift register bits of the identification number to be transmitted in the PRBN portion of the encoded message. Thereafter, the receiver microprocessor will validate the received message by comparing the corresponding bits of the reference identification number to the received identification number. For example, if the PRBN generator in the transmitter of FIG. 3 comprises a LFSR built around a prime polynomial of order 34, then it will produce a maximal length sequence of 34-bit binary numbers, the sequence comprising $2^{34}-1$ pseudo ransom binary numbers. When the transmitter is activated, the 34-bit binary number is provided to the transmitter microprocessor, and the microprocessor may be programmed to transmit only 20-bits of the 34-bit number, e.g., bit 5 through bit 24, in the PRBN portion of the encoded message. Thereafter, once the receiver verifies the check sum and the fixed ID number, it compares the received identification number to the corresponding 20-bits of the reference identification number to validate the message.

The PRBN generators used in the remote operating system are described herein as comprising dedicated digital hardware. However, the PRBN generators may also be implemented using an algorithmic subroutine executed by a microprocessor if desired. In such case, it may be implemented in a different fashion from that disclosed herein in accordance with the general equivalence between dedicated digital hardware and software, all as is well known to those skilled in the art.

The number of bits in each pseudo random binary number is dependant upon the number of bits in the shift register which make up the PRBN generators. The number of bits in the shift register is in turn dependant upon the order of the polynomial which it implements. The order of the polynomial selected to implement the PRBN generator will depend on the level of security desired, with the higher order polynomials providing the greater security. Although the invention is described as using a mathematics in base two for generating identification numbers and reference numbers, the invention will work equally as well with arithmetic operation over any Galois Field.

The receiver is described as storing the reference identification number corresponding to the last valid received message identification number in the reference number memory. However, the invention would work equally as well if the receiver was cycled after receipt of a valid message so that the reference number corresponding to the expected value of the next valid received message identification number is stored in the reference number memory. In this case, after the check sum and fixed ID number of a received message are validated, the identification number is validated by comparing it to the number stored in the reference identification number memory. If the numbers match, the receiver PRBN is cycled to produce the next reference identification number, which is thereafter stored in the reference number memory. If the numbers do not match, the receiver PRBN generator is cycled, and if a matching reference number is found within the search length, the received message is valid and the commanded action is performed. Thereafter, the receiver PRBN generator is cycled to produce the next reference identification number which is stored in the reference identification number memory.

Although the remote operating system is described as using radio frequency signals to communicate encoded messages between the transmitter and receiver, the invention will work equally as well using any suitable method of data transmission, e.g., infrared light, ultrasonic signals, etc. Additionally, although the invention is described as being used for the remote operation of automobile door locks, it will work equally as well in a variety of applications requiring operation of a device from a remote location, e.g., garage door opening, activation of a security or alarm system, unlocking or repositioning of access doors and panels, remote elevator call, positioning of automobile seats, etc.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

We claim:

1. A remote operating system for remote-controlled operation of a device, comprising:
   transmitting means having:
   means for transmitting encoded messages, each message comprising an identification number portion and a command code portion,
   command means for providing at least one command code signal, each command code signal corresponding to an operating condition of the device, said encoded message command code portion containing a command code signal,
   pseudo random binary number (PRBN) generating means comprising a generator polynomial derived from a prime polynomial for generating a sequence of identification numbers, the length of said sequence of identification numbers being dependant upon the order of said prime polynomial, said encoded message identification number portion being selected as the next identification number in said sequence of identification numbers each time said transmitting means is actuated; and
   receiving means, connected for communication with the device, having:
   means for receiving said encoded messages,
   PRBN generating means comprising a generator polynomial derived from a prime polynomial for generating a sequence of reference numbers, said receiving means PRBN generating means generator polynomial being identical to said transmitting means PRBN generating means generator polynomial, said sequence of reference numbers being identical to said sequence of identification numbers,
   reference number memory means for storing the current reference number in said sequence of reference numbers,
   signal processing means responsive to receiving an encoded message for selecting the next reference number from said sequence of reference numbers, and responsive to there being identity between the next reference number and said encoded message identification number portion for replacing the current reference number with the next reference number in said reference number memory means, and for providing said encoded message command code portion to the device.

2. A remote operating system according to claim 1 wherein said signal processing means further comprises automatic re-synchronization means responsive to the next reference number not being identical to said encoded message identification number portion for searching for a matching reference number in said sequence of reference numbers, within a search length of reference numbers following the next reference number, which matches said encoded message identification number portion, and responsive to finding a matching reference number within said search length for replacing the current reference number with said matching reference number in said reference number memory means, and for providing said encoded message command code portion to the device.

3. A remote operating system according to claim 1 wherein said transmitting means further comprises:
   manually actuable re-synchronization means for consecutively providing a re-synchronization message and a validation message in response to the activation of said manually actuable re-synchronization means, said re-synchronization message comprising a count signal indicative of the number of times said transmitting means has been activated less a random number having a magnitude smaller than said search length, said validation message comprising an identification number portion and a command code portion, said validation message identification number portion being selected as the next identification number in said sequence of identification numbers;
   said signal processing means being responsive to said re-synchronization message for setting said next reference number equal to the reference number in said sequence of reference numbers corresponding to said count signal; and
   said signal processing means being responsive to said validation message for searching for a matching reference number in said sequence of reference numbers, within a search length of reference numbers following the next reference number, which matches said validation message identification number portion, and responsive to finding a matching reference number within said search length for replacing the current reference number with said matching reference number in said reference number memory means, and for providing said command code portion of said encoded message to the device.

4. A remote operating system according to claim 1 wherein deriving said PRBN generating means generator polynomials from said prime polynomials results in said generator polynomials being equal to said prime polynomials.

5. A remote operating system according to claim 1 wherein each number in said sequence of identification numbers and in said sequence of reference numbers is provided by selecting a subset of the bits from the total bits of each number produced by said PRBN generating means.

6. A remote operating system according to claim 1 wherein said PRBN generating means in said transmitting means and in said receiving means are linear feedback shift registers which implement said generator polynomials.

7. A remote operating system according to claim 4 wherein said PRBN generating means in said transmitting means and in said receiving means are maximal length linear feedback shift registers which implement said prime polynomials.

8. A remote operating system according to claim 1 wherein said transmitting means and said receiving means further comprise means for providing a non-zero seed number to said PRBN generating means.

9. A remote operating system for remote-controlled operation of at least one lock in an electronic locking system, comprising:
    a transmitter having:
    means for transmitting encoded messages, each message comprising an identification number portion and a command code portion,
    command means for providing a first command code signal corresponding to the locks being in the locked position and for providing a second command code signal corresponding to the locks being in the unlocked position, said encoded message command code portion containing one of said command code signals,
    linear feedback shift register (LFSR) means for implementing a generator polynomial derived from a prime polynomial, said LFSR means generating a sequence of identification numbers, the length of said sequence of identification numbers being dependant upon the order of said prime polynomial, the identification number portion of said message being selected as the next identification number in said sequence of identification numbers each time said transmitter is actuated; and
    a receiver, connected for communication with the locking system, having:
    means for receiving said encoded messages,
    LFSR means for implementing a generator polynomial derived from a prime polynomial, said LFSR means generating a sequence of reference numbers, said receiver LFSR means generator polynomial being identical to said transmitter LFSR means generator polynomial, said sequence of reference numbers being identical to said sequence of identification numbers,
    reference number memory means for storing the current reference number in said sequence of reference numbers,
    signal processing means responsive to receiving an encoded message for selecting the next reference number from said sequence of reference numbers, and responsive to there being identity between the next reference number and said encoded message identification number portion for replacing the current reference number with the next reference number in said reference number memory means, and for providing said command code portion of said encoded message to the locking system.

10. A remote operating system according to claim 9 wherein said signal processing means further comprises automatic re-synchronization means responsive to the next reference number not being identical to said encoded message identification number portion for searching for a matching reference number in said sequence of reference numbers, within a search length of reference numbers following the next reference number, which matches said encoded message identification number portion, and responsive to finding a matching reference number within said search length for replacing the current reference number with said matching reference number in said reference number memory means, and for providing said encoded message command code portion to the locking system.

11. A remote operating system according to claim 9 wherein said transmitting means further comprises:
    manually actuable re-synchronization means for consecutively providing a re-synchronization message and a validation message in response to the activation of said manually actuable re-synchronization means, said re-synchronization message comprising a count signal indicative of the number of times said transmitting means has been activated less a random number having a magnitude smaller than said search length, said validation message comprising an identification number portion and a command code portion, said validation message identification number portion being selected as the next identification number in said sequence of identification numbers;
    said signal processing means being responsive to said re-synchronization message for setting said next reference number equal to the reference number in said sequence of reference numbers corresponding to said count signal; and
    said signal processing means being responsive to said validation message for searching for a matching reference number in said sequence of reference numbers, within a search length of reference numbers following the next reference number, which matches said validation message identification number portion, and responsive to finding a matching reference number within said search length for replacing the current reference number with said matching reference number in said reference number memory means, and for providing said command code portion of said encoded message to the locking system.

12. A remote operating system according to claim 9 wherein deriving said LFSR means generator polynomials from said prime polynomials results in said generator polynomials being equal to said prime polynomials, and wherein said LFSR means are maximal length linear feedback shift registers.

13. A remote operating system according to claim 9 wherein each number in said sequence of identification numbers and in said sequence of reference numbers is provided by selecting a subset of the bits from the total bits of each number produced by said LFSR means.

14. A remote operating system according to claim 9 wherein said transmitting means and said receiving means further comprise means for providing a non-zero, binary number seed to said PRBN generating means.

15. A remote operating system for remote-controlled operation of a device, comprising:
a transmitter having:
means for transmitting a message encoded with an identification number,
identification number generating means comprising a generator polynomial derived from a prime polynomial for generating a sequence of identification numbers, the length of said sequence of identification numbers being dependant upon the order of said prime polynomial, said message being encoded with the next identification number in said sequence of identification numbers each time said transmitter is actuated; and
a receiver, connected for communication with the device, having:
means for receiving said messages, and for decoding said message to provide a received identification number,
reference number generating means comprising a generator polynomial derived from a prime polynomial for generating a sequence of reference numbers, said sequence of reference numbers being identical to said sequence of identification numbers, said reference number generating means being responsive to said receiver receiving a message for selecting the next reference number from said sequence of reference numbers, and
signal processing means responsive to there being identity between the next reference number and said received identification number for operating the device.

16. A remote operating system according to claim 15 wherein said signal processing means further comprises automatic re-synchronization means responsive to the next reference number not being identical to said received identification number for searching for a matching reference number in said sequence of reference numbers, within a search length of reference numbers following the next reference number, which matches the received identification number, and responsive to finding a matching reference number within said search length for operating the device.

17. A remote operating system according to claim 15 wherein said transmitting means further comprises:
manually actuable re-synchronization means for consecutively providing a re-synchronization message and a validation message in response to the activation of said manually actuable re-synchronization means, said re-synchronization message being encoded with a count signal indicative of the number of times said transmitting means has been activated less a random number having a magnitude smaller than said search length, said validation message being encoded with an identification number selected as the next identification number in said sequence of identification numbers;
said signal processing means being responsive to said re-synchronization message for setting said next reference number equal to the reference number in said sequence of reference numbers corresponding to said count signal; and
said signal processing means being responsive to said validation message for searching for a matching reference number in said sequence of reference numbers, within a search length of reference numbers following the next reference number, which matches the received identification number from said validation message, and responsive to finding a matching reference number within said search length for operating the device.

18. A remote operating system according to claim 15 wherein deriving said identification number generating means generator polynomial and said reference number generating means generator polynomial from said prime polynomials results in said generator polynomials being equal to said prime polynomials.

19. A remote operating system according to claim 15 wherein each number in said sequence of identification numbers and in said sequence of reference numbers is provided by selecting a subset of the bits from the total bits of each number produced by said PRBN generating means.

20. A remote operating system according to claim 15 wherein said identification number generating means and said reference number generating means are linear feedback shift registers (LFSR) which implement said generator polynomials.

21. A remote operating system according to claim 18 wherein said identification number generating means and said reference number generating means are maximal length linear feedback shift registers (LFSR) which implement said prime polynomials.

22. A remote operating system according to claim 20 wherein said transmitting means and said receiving means further comprise means for providing a non-zero seed number to said LFSRs.

23. A remote operating system according to claim 21 wherein said transmitting means and said receiving means further comprise means for providing a non-zero seed number to said maximal length LFSRs.

* * * * *

UNITED STATES PATENT AND TRADEMARK OFFICE
CERTIFICATE OF CORRECTION

PATENT NO. : 5,191,610

DATED : March 2, 1993

INVENTOR(S) : John P. Hill et al

It is certified that error appears in the above-identified patent and that said Letters Patent is hereby corrected as shown below:

Column 3, Line 64, after "of" insert --identification and reference numbers being provided by--.

Signed and Sealed this

Fourteenth Day of December, 1993

Attest:

BRUCE LEHMAN

*Attesting Officer*  *Commissioner of Patents and Trademarks*